United States Patent [19]

Dettmann et al.

[11] 4,137,660
[45] Feb. 6, 1979

[54] IDENTIFICATION HOLDERS FOR DOGS AND CATS

[76] Inventors: Eileen A. Dettmann, Rte. 1, Box 109, Prairie View, Ill. 60069; Arthur J. Thomas, 500 N. Greenwood Dr., Palatine, Ill. 60067

[21] Appl. No.: 798,301

[22] Filed: May 19, 1977

[51] Int. Cl.² ............................................. G09F 3/20
[52] U.S. Cl. ............................................. 40/303
[58] Field of Search ............... 40/300, 21 C, 303, 304, 40/17, 486; 119/106

[56] References Cited

U.S. PATENT DOCUMENTS

| | | | |
|---|---|---|---|
| 1,657,250 | 1/1928 | Fetters | 119/106 |
| 2,255,999 | 9/1941 | Kuehner | 40/21 C X |
| 2,893,143 | 7/1959 | Mosher et al. | 40/21 C |
| 3,020,658 | 2/1962 | Clark | 40/21 C |
| 3,805,427 | 4/1974 | Epstein | 40/21 C |

FOREIGN PATENT DOCUMENTS 315971  10/1956  Switzerland ............... 40/21 C

*Primary Examiner*—Louis G. Mancene
*Assistant Examiner*—Wenceslao J. Contreras
*Attorney, Agent, or Firm*—Darbo & Vandenburgh

[57] ABSTRACT

An identification tag for a dog, cat or the like is carried by a holder fastened to a collar, harness or leash. The holder comprises a transparent plastic pocket open at one end secured to the collar and overlaid by a protecting strap held in place by a rivet at one end and a snap fastener at the open end of the pocket permitting the strap to be lifted or rotated about the rivet to insert an elongated identification tag or to view identification information.

7 Claims, 6 Drawing Figures

U.S. Patent
Feb. 6, 1979
4,137,660
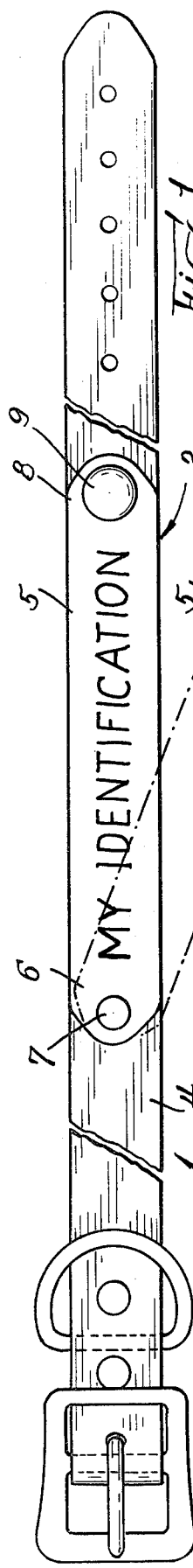
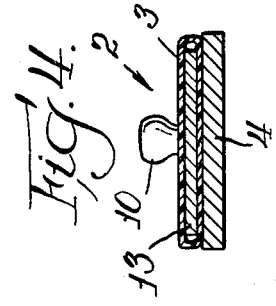
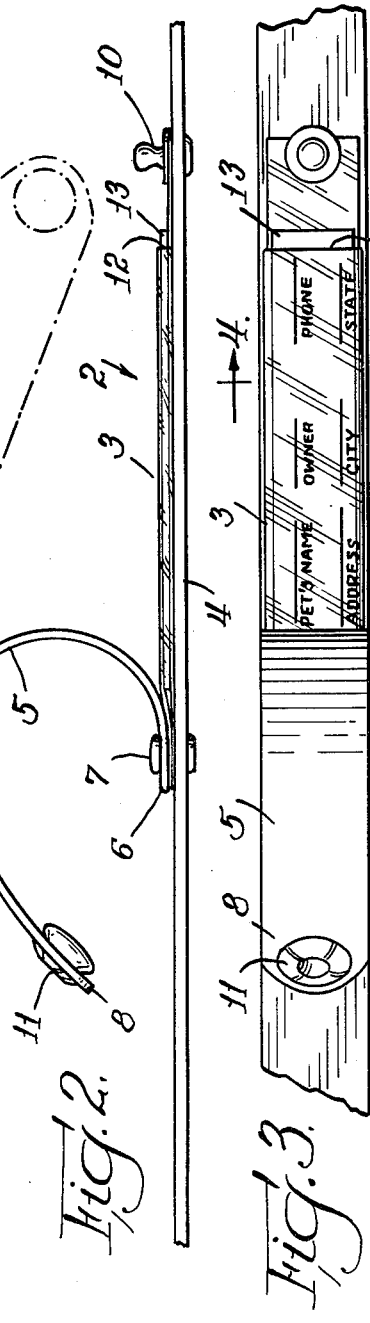
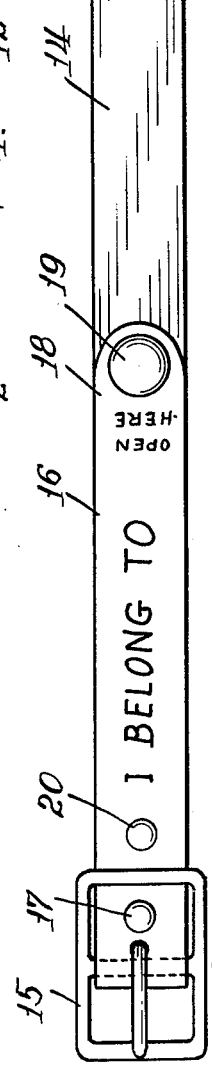
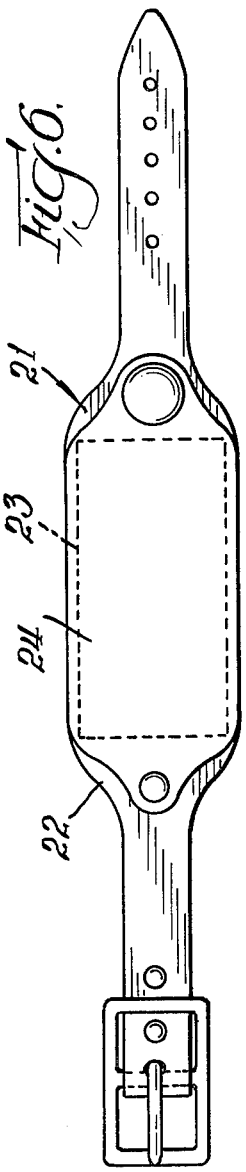

IDENTIFICATION HOLDERS FOR DOGS AND CATS

BACKGROUND AND SUMMARY OF THE INVENTION

As a valued possession or pursuant to requirement of law, most dogs, cats and other small animal pets carry information from which their owners can be identified in the event, for example, that the animal is lost. Such identification tags are usually in the form of small metal disks carrying appropriate information and fastened to the collar or harness worn by the animal. Frequently medical information is also provided in this way. Such metal disks can be made only with the use of special tools or equipment and are frequently lost by sliding through the gap in a ring intended to fasten the tag to the collar. The disks may also be something of a nuisance in that they create noise or may get in the way when the animal is eating.

The object of the invention herein described is to provide improved means for providing identification and other information for dogs, cats, and other small animal pets. The necessary information is printed on an elongated strip of cardboard, plastic or the like which slides into, is protected by, and may be viewed through, a transparent flexible plastic pocket fastened to a collar, harness or leash. The pocket containing the cardboard tag is, in turn, covered and protected by a flexible strap which is fastened by its ends to the collar, harness or leash at points just beyond the respective ends of the pocket, one end being secured by means of a snap fastener so that it can be lifted or swung out of the way to expose the identification tag. If desired, medical and other useful information can be shown on the reverse side of the tag.

DESCRIPTION OF THE DRAWING

In the accompanying drawing,

FIG. 1 is a plan view of a typical dog collar to which the identification holder is attached and indicating how the protective strap may be pivoted to one side to reveal the identification data;

FIG. 2 is a side view showing the assembly of FIG. 1 with the protective strap bent back out of the way;

FIG. 3 is a top view of the assembly of FIG. 2;

FIG. 4 is a cross-sectional view taken at the line 4—4 of FIG. 3;

FIG. 5 is a plan view of an alternative embodiment of the invention, and

FIG. 6 is a plan view of a typical cat or very small dog collar carrying a relatively larger identification holder.

EMBODIMENTS OF BEST MODE OF THE INVENTION

The identification holder of this invention is designed for attachment to any portion of the collar or harness ordinarily worn or carried by the pet which is long enough to accommodate the holder and otherwise suitable for supporting the holder. It may also be attached to a portion of a leash, this application being especially useful for large dogs with which choke collars are used to provide identification in the event of escape of the animal with the leash attached.

The identification holder may be attached to the supporting accessory in various ways, several of the preferred arrangements being shown in the drawing and now described.

A typical dog collar 1 with the identification holder 2 attached thereto is shown in FIGS. 1-4. The collar may be made of leather, plastic or other flexible material. The holder comprises an elongated or deep transparent pocket 3 which is permanently cemented or otherwise attached to the side of the collar that is exposed when the collar is in place on the neck of the dog. As is best shown in FIG. 4, the pocket may conveniently be in the form of a flat flexible plastic sleeve cemented to the body 4 of the dog collar. The sleeve, and therefore the pocket formed by the sleeve, should be no wider than the portion of the collar to which it is attached so that it is not unnecessarily exposed to wear and possible damage along its sides.

The pocket is covered and protected by a flexible strap 5 of leather, plastic or other suitable material. The strap is fastened at both ends to the body of the collar. Clasp fasteners may be used at both ends, but since it is never necessary to detach one end from the collar, this end 6 is preferably permanently attached by means of a rivet 7. Since there is some advantage in being able to swing strap 5 to one side or the other, as is indicated in dot-dash lines in FIG. 1, a nail rivet is preferably used to secure end 6 of the strap to the collar so that it is not tightly immobilized but is attached sufficiently loosely to permit swinging the strap to right angle positions in either direction from the collar.

As is shown in FIG. 2, the end of the plastic tube forming the bottom of pocket 3 is preferably extended to underlie the end 6 of the strap so that it is clamped between the strap and the collar by rivet 7 to close that end of the tube and for the additional security thus provided.

The end 8 of strap 5 is secured to the collar by means of a snap fastener 9 the base 10 of which may be permanently mounted in the body of the dog collar while the cap 11 of the snap fastener is permanently mounted in end 8 of the strap. When snapped into position, the strap overlies and protects pocket 3 from wear or damage.

As is shown in FIGS. 2 and 3, the end of the plastic tube which provides the open top of pocket 3 is cut to provide the pocket opening while the back of the sleeve extends under snap fastener base 10 so that it is permanently clamped to the dog collar. The open top 12 of pocket 3 is accessible when strap 5 is either swung to one side or the other or bent back as shown in FIG. 2. A strip 13 of cardboard or other suitable material carrying the identification and other information is inserted into the pocket through the open top 12 so that the information can be read through the transparent plastic of which pocket 3 is composed. The strip 13 may be removed if necessary to change the information shown on it or insert a replacement strip as may be required.

An alternative arrangement for providing a dog collar with the identification holder is shown in FIG. 5. In this embodiment of the invention, the holder is "built in"; that is, it is a part of the collar rather than an attachment. The strap 14 forming the collar bends back at buckle 15 with end portion 16 overlying the portion of strap 14 adjacent to the buckle. The buckle is secured in the usual manner by a rivet 17.

The portion 16 of strap 14 is long enough to cover and protect a transparent plastic pocket containing an identification strip, not shown in FIG. 5. The end 18 of the strap is detachably fastened to strap 14 by means of snap fastener 19 and a rivet 20 may be used, like rivet 7 in the embodiment previously described, to permanently clamp the strap parts and the bottom of the plastic pocket together. This rivet is not entirely necessary; also, a single rivet may be employed to serve the functions of rivets 17 and 20.

For access to the pocket for insertion of an identification strip or to view the strip, the snap fastener may be disengaged by pulling up on end 18 of the strap and bending it back out of the way in the manner indicated in FIG. 2.

The embodiment of the invention shown in FIG. 6 shows the identification holder 21 mounted upon a very small collar such as would be used on a cat or very small dog. The portion 22 of the collar over which the identification holder is attached should be at least as wide as the holder assembly so that the pocket 23 will be fully protected by the underlying collar and the overlying strap 24.

As is indicated in the drawing, appropriate notice that identification of the animal is to be found under the protective strap should be carried by the strap. Messages such as "MY IDENTIFICATION" and "I BELONG TO" might be used and instructions to "OPEN HERE" might be located adjacent the snap fastener.

It will be understood that a variety of demountable attachment means may be employed as alternatives to the snap fastener. For example, a buckle may be mounted in the collar by which the end of the protective strap is attached. Many other types of fastening means are available.

This invention provides simple but dependable means for providing identification and other useful information to be carried by pets at all times. There is no need for the pet owner to have an identification tag custom made. If necessary, the information given on the tag may be altered as necessary without purchasing either a new part or a service. The convenience of the identification holder of this invention should tend to promote the full identification of all pets for the convenience of regulatory authorities, the public and the pet owners.

We claim:

1. In an animal pet collar, an identification holder comprising a deep transparent plastic pocket having only its top end open, said pocket being permanently fastened to a portion of said collar on the outside thereof, an elongated flexible tag disposed in said pocket, said tag being adapted to carry identification indicia exposed to view through said transparent pocket, and a flexible strap overlying said pocket, means for fastening each end of said strap to said collar, said strap being fastened at its ends to said collar, at least the end of said strap at the open top of said pocket being demountably fastened whereby to provide visual and physical access to said tag.

2. An identification holder in accordance with claim 1 wherein the pocket comprises a flattened plastic tube cemented to the pet collar along the outside surface thereof.

3. An identification holder in accordance with claim 2 wherein at least the under back portion of the tube is additionally fastened to the collar by the means fastening the ends of said strap to said support, the top end portion of the front portion of said tube being cut away to provide a permanently open top for the pocket.

4. An identification holder in accordance with claim 1 wherein the means for fastening the end of the strap to the collar at the open top of the pocket is a snap fastener.

5. An identification holder in accordance with claim 1 wherein the means for fastening the end of the strap to the collar at the bottom of the pocket is a nail rivet whereby said strap may be rotated about said rivet to provide access to the tag.

6. An identification holder in accordance with claim 5 wherein the rivet passes through the bottom of the pocket as well as the collar and strap to permanently close the bottom of said pocket.

7. An identification holder in accordance with claim 1 wherein the pet collar includes a buckle at one end thereof and the strap is a continuation of said collar doubled back at said buckle to overlie the pocket, the means for fastening said strap to said collar at the bottom of the pocket comprising a rivet passing through at least said collar and said strap, the means for fastening the end of said strap to said collar comprising a snap fastener.

* * * * *